(12) United States Patent
Bak et al.

(10) Patent No.: US 9,071,520 B2
(45) Date of Patent: Jun. 30, 2015

(54) SPATIAL REPRESENTATION OF TEMPORAL VALUE DISTRIBUTIONS

(75) Inventors: Peter Bak, Haifa (IL); Asaf Shaar, Haifa (IL); Harold-Jeff Ship, Galil Tachton (IL); Avi Yaeli, Ramot Menashe (IL)

(73) Assignee: International Business Machines Corporation, Armonk, NY (US)

( * ) Notice: Subject to any disclaimer, the term of this patent is extended or adjusted under 35 U.S.C. 154(b) by 622 days.

(21) Appl. No.: 13/345,717

(22) Filed: Jan. 8, 2012

(65) Prior Publication Data

US 2013/0179817 A1  Jul. 11, 2013

(51) Int. Cl.
| G06T 11/20 | (2006.01) |
| H04L 12/26 | (2006.01) |
| H04L 12/24 | (2006.01) |

(52) U.S. Cl.
CPC .......... *H04L 43/0882* (2013.01); *G06T 11/206* (2013.01); *H04L 41/142* (2013.01); *H04L 41/22* (2013.01); *H04L 41/12* (2013.01)

(58) Field of Classification Search
CPC .......... G06T 11/206; G06T 11/20; G06F 7/00
USPC ........................................................ 715/771
See application file for complete search history.

(56) References Cited

U.S. PATENT DOCUMENTS

| 7,400,932 | B2 | 7/2008 | Ackley |
| 7,940,271 | B2 | 5/2011 | Wright et al. |
| 8,350,856 | B1 * | 1/2013 | Nazir et al. .................. 345/440 |
| 8,694,241 | B1 * | 4/2014 | Kadous et al. ............... 701/412 |
| 2009/0031019 | A1 * | 1/2009 | Burr et al. .................... 709/224 |
| 2009/0040228 | A1 * | 2/2009 | Lee et al. ...................... 345/440 |
| 2009/0216808 | A1 * | 8/2009 | Wallace ...................... 707/104.1 |
| 2011/0179066 | A1 | 7/2011 | Cardno et al. |
| 2011/0187720 | A1 * | 8/2011 | Pedersen ..................... 345/442 |

OTHER PUBLICATIONS

Peter Bak, Spatiotemporal Analysis of Sensor Logs using Growth Ring Maps, IEEE Transactions on Visualization and Computer Graphics, vol. 15, No. 6, Nov./Dec. 2009, p. 913-920.*

Jarke J. van Wijk, Cluster and Calendar based Visualization of Time Series Data, Information Visualization, 1999. (info Vis '99) Proceedings, 1999 IEEE Symposium on , date of conference 1999, pp. 4-9, San Francisco CA; ISSN: 1522-404x, IEEE Xplore.*

(Continued)

*Primary Examiner* — Devona Faulk
*Assistant Examiner* — Hai Tao Sun
(74) *Attorney, Agent, or Firm* — Suzanne Erez; William H. Hartwell

(57) ABSTRACT

Systems and methods for presentation of value distributions in a graphical user interface are provided. The method comprises computing a plurality of value distributions based on measurements performed for target values for one or more measurements spread across a space, wherein a series of measurements are performed for at least a target point in the space; computing a cumulative distribution for the plurality of value distributions associated with the target point along predetermined time intervals; dividing the cumulative distribution into bins for one or more time periods corresponding to said predetermined time intervals; mapping attributes associated with the target point into shapes; and using a scaling function, assigning a color attribute from a color scheme to each bin.

20 Claims, 6 Drawing Sheets

(56) References Cited

OTHER PUBLICATIONS

Bak et al., "Spatiotemporal Analysis of Sensor Logs using Growth Ring Maps", IEEE Transactions on Visualization and Computer Graphics, vol. 15 Issue:6 , pp. 913-920, Nov. 2009.

Keim et al., "Generalized scatter plots", Journal Information Visualization archive, vol. 9 Issue 4, Winter 2010.

Donna J. Peuquet, "It's About Time: A Conceptual Framework for the Representation of Temporal Dynamics in Geographic Information Systems", Annals of the Association of American Geographers, vol. 84, Issue 3, pp. 441-461, Sep. 1994.

Dykes et al., "Seeking structure in records of spatio-temporal behaviour: visualization issues, efforts and applications", Computational Statistics & Data Analysis, vol. 43, Issue 4, pp. 581-603, Aug. 28, 2003.

MacEachren et al.,"Geographic visualization: designing manipulable maps for exploring temporally varying georeferenced statistics", IEEE Symposium on Information Visualization, 1998. Proceedings, pp. 87-94, 156, Oct. 1998.

Thomas Kapler and William Wright, "GeoTime Information Visualization" Information Visualization 4, pp. 136-146, 2005.

Hewagamage et al.,"Interactive visualization of spatiotemporal patterns using spirals on a geographical map", IEEE Symposium on Visual Languages, 1999. Proceedings, pp. 296-303, 1999.

Wood et al,. "Interactive Visual Exploration of a Large Spatio-Temporal Dataset: Reflections on a Geovisualization Mashup", IEEE Transactions on Visualization and Computer Graphics, vol. 13, No. 6, pp. 1176-1183, Nov./Dec. 2007.

Weber et al., "Visualizing Time-Series on Spirals", ieee_infovis, pp. 7, 2001 IEEE Symposium on Information Visualization (InfoVis 2001), 2001.

Guo et al., "A Visual Inquiry System for Space-Time and Multivariate Patterns (VIS-STAMP)", IEEE Transactions on Visualization and Computer Graphics, vol. 12, No. 6, pp. 1461-1474, Nov./Dec. 2006.

Tominski et al., "3D Information Visualization for Time Dependent Data on Maps", IV, pp. 175-181, Ninth International Conference on Information Visualisation (IV'05), 2005.

Maciejewski et al., "Forecasting Hotspots—A Predictive Analytics Approach," IEEE Transactions on Visualization and Computer Graphics, vol, 17, No. 4, pp. 440-453, Apr. 2011.

Maciejewski et al., "A Visual Analytics Approach to Understanding Spatiotemporal Hotspots," IEEE Transactions on Visualization and Computer Graphics, Aug. 19, 2009.

May Yuan, "Temporal GIS and Spatio-Temporal Modeling Abstract", Published on CD-ROM by the National Center for Geographical Information and Analysis, 1996.

Girardin et al., "Understanding of Tourist Dynamics from Explicitly Disclosed Location Information", In Proc. of the 4th International Symposium on LBS and Telecartography, Hong-Kong, China, 2007.

\* cited by examiner

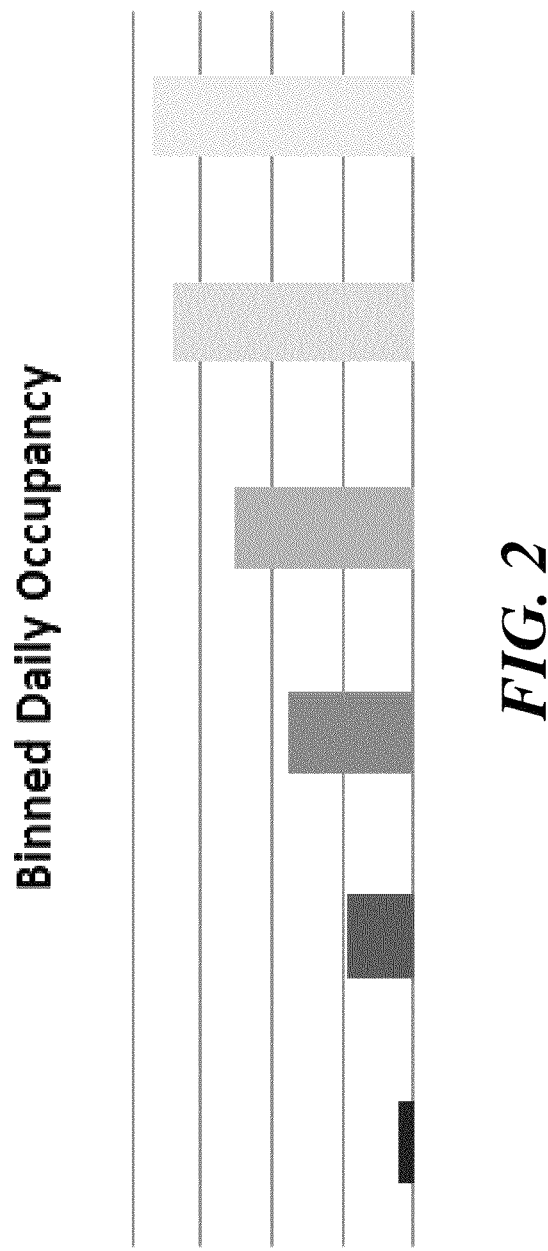

SPATIAL REPRESENTATION OF TEMPORAL VALUE DISTRIBUTIONS

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to visual representation of data and, more particularly but not exclusively, to a system and method for spatial representation of temporal value distribution.

BACKGROUND

The proliferation of sensors and global positioning systems in mobile devices, in particular, has lead to even larger amounts of data being generated and communicated at every slice of time. Collection of such data, at times, may be helpful or needed for understanding or analysis of the environment in which the data was gathered. Since this data has multi-dimensional attributes involving time and space, the visual presentation of the data in a form that is readily comprehendible is very challenging.

For example, in the communications industry, an analyst may want to visually explore wireless hotspots that are distributed in a city, with a focus on the number of connections (i.e., occupancy) at every hour of the day for every hotspot. It may also be desirable to compare hotspots by their occupancy or correlate occupancy patterns based on the spatial distribution of the hotspots in the city. To accomplish the above tasks, the spatial topology (e.g., a map) of the city as well as an understanding of the distribution of the data produced by the sensors in the mobile or wireless network are needed.

Referring to FIG. 1A, a classic representation for the above noted data may include one or more distribution charts overlaid on a map. Unfortunately, such a solution is space inefficient in that it does not provide for a meaningful display of data on the screen when a plurality of distribution charts need to be displayed side-by-side for the purpose of comparison (e.g., comparing the size of the bars). In other words, the limitations associated with the size of the chart in relation to the map and the number of locations on the screen that are to be simultaneously presented would make it difficult for a human operator to easily assess the temporal data distributions in the spatial arrangement shown in FIG. 1A.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one embodiment, a method for presentation of value distributions in a graphical user interface comprises computing a plurality of value distributions based on measurements performed for target values for one or more positions spread across a space, wherein a series of measurements are performed for at least a target point in the space; computing a cumulative distribution for the plurality of value distributions associated with the target point along predetermined time intervals; dividing the cumulative distribution into bins for one or more time periods corresponding to said predetermined time intervals; mapping attributes associated with the target point into shapes; using a scaling function, assigning a color attribute from a color scheme to each bin; and normalizing size of the shape based on visual properties before the shape is graphically rendered in the graphical user interface.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

FIG. 2 is an exemplary diagram of a legend showing a color coding scheme for distinguishing between various data distribution levels, in accordance with one embodiment.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1A:
FIG. 1A illustrates an exemplary computer-implemented graphical interface showing a distribution chart associated with a point on a geographic map.
Figure 1B:
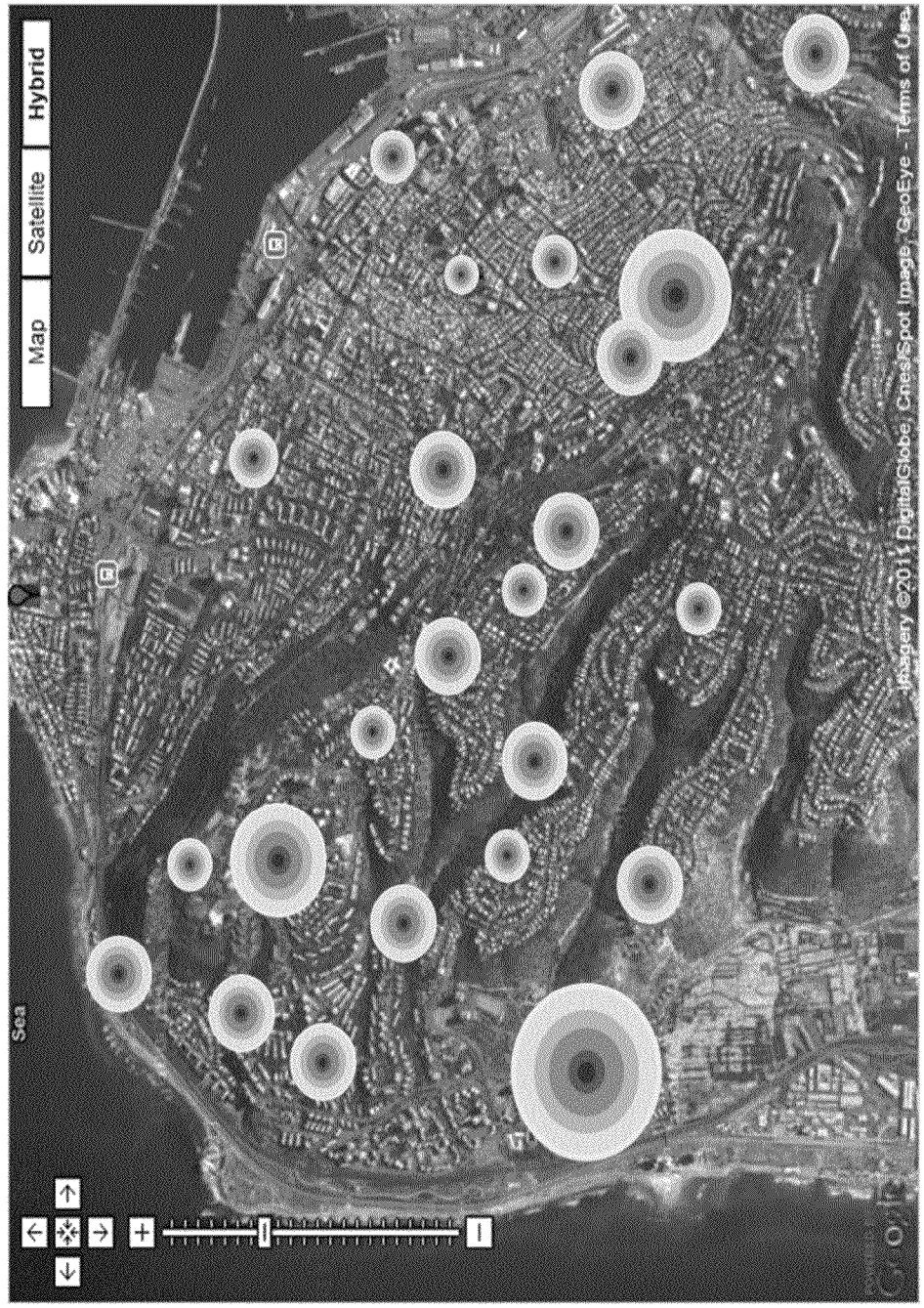
FIG. 1B illustrates an exemplary computer-implemented graphical interface, in accordance with one embodiment, showing a plurality of temporal distribution presentations associated with a point on a geographic map.

Referring to FIG. 1B, an exemplary visual spacial representation of temporal data distributions is provided according to a layout algorithm, which sorts overlapping events by their color value and lays them out in an orbital manner, for example. As shown, a geographic map may be implemented, in accordance with one embodiment, as generated by way of a spatial clustering algorithm, which collects neighboring events and lays them out on a subject map. Changes in visual attributes may be used to map time to the pixels. For example, one or more rings may represent a temporal distribution in which the total area of a ring defines the temporal factor and the intensity of the associated visual attribute (e.g., color, shade, hue, or saturation of the ring) defines the increase or decrease in the distribution of data over time.

Referring to FIGS. 1B and 2, in an exemplary scenario related to the use of wireless service in the mapped city, the darker color rings shown at the center of each circle in FIG. 1B may be associated with a low level of daily occupancy (i.e., a relatively small number of daily connections) at a mapped spot, and the lighter colored rings may be associated with a high level of daily occupancy (see legend in FIG. 2). A larger outer orbit at a mapped spot is an indication that the target spot was active longer than a spot with a smaller outer orbit. Thus, the color of the outmost orbit for a mapped spot is an indication of the change in the level of distribution for that spot during the last slice of time mapped. For example, if the outmost ring of a first spot on the map is lighter than the outmost ring of a second spot, then it may be deduced that the connection activity level at the first spot increased more than that of the second spot.

It is noteworthy that, in exemplary embodiments disclosed here, the events and temporal distribution of the data are represented in a circular or orbital manner with different color intensities. These exemplary illustrations, however, should not be narrowly construed to exclusively limit the scope of the claimed subject matter to graphical presentations depicted here. Rather, alternative embodiments may be implemented using other or a combination of different visual representations and visual effects as suitable within the context of this disclosure. For example, instead of a circular shape, a triangular, square or other geometric shape may be used; and instead of color or gray shade intensity, lined or dotted patterns of various opacity or shape may be used.

Advantageously, the proposed graphical representations here are not limited by the screen size (i.e., number of events can be larger than number of pixels on the screen) and are scalable with the number of locations, observations and temporal resolutions. Furthermore, the proposed illustration methods support user interaction with the display content to allow scalable zooming, highlighting, selection and panning. In one embodiment, the related attributes of a target spot may be even animated, for example, to display evolving rings of different colors, shades, patterns and diameters that represent changes in data distribution over time. Even further, certain embodiments may be implemented in three-dimensional space or graphical environments, whether in animated or unanimated form to provide for additional depth of user experience.

In some embodiments, spatiality may be extended beyond geographic space, as applied to any x-y coordinate system, such as in scatter plots, bubble charts, etc. Further, distribution may extend beyond temporal distribution, as applied to any sequential, continuous or categorical distribution. Moreover, user interaction may be supported to an extent in which a user may be involved at any stage of the process (e.g., setting the temporal or any other resolution level for aggregation, choosing the scaling of the rings by available screen space, or spatial distribution, choosing the color mapping, or the color scaling (task dependent: norm or outlier finding (exp, log, bin, lin, etc.)).

In the following, for the purpose of illustration and brevity, an exemplary method for visually presenting temporal data distributions in a spatial environment is provided, wherein changes in distribution of data overtime is represented by rings with various gray shade intensities. The rings propagate away in time from a central point of interest (i.e., target point) which is identified by a coordinate on a mapped space. Multiple points of interest may thus be displayed on a map, where for example the size and color of the rings indicate the changes (i.e., increase or decrease) in the distribution of data at the target point, over time.

Figure 3:
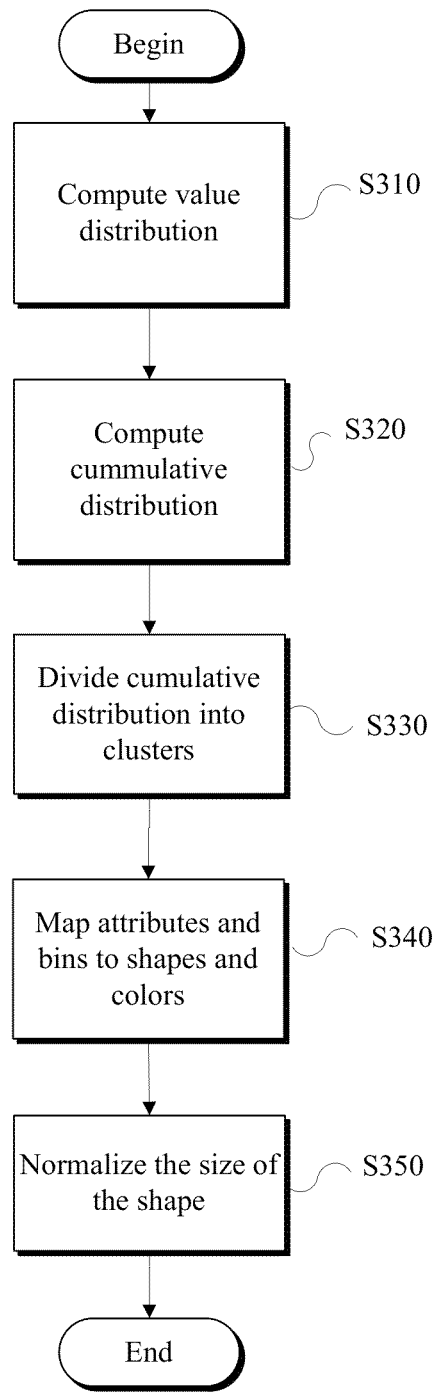
FIG. 3 is a flow diagram of an exemplary method for spatial representation of temporal data distribution values, in accordance with one embodiment.

Referring to FIG. 3, for a target point on the map, the value distribution for an attribute of interest is computed (S310). For example, in a wireless network, the daily occupancy per hour of the day for a location in the city may be the attributed of interest. For a target point and the corresponding attribute, the cumulative temporal distribution is computed (S320). The cumulative distribution is divided into clusters or bins for one or more time periods (S330). In one embodiment, user input may be provided to define the temporal resolution for the attribute of interest, so that a higher or lower level of detail for each the distribution segment may be displayed in a readily scalable fashion.

The attributes may be mapped to shapes and, using a scaling function, a color or shade from a color scheme may be assigned to each bin to visually distinguish a distribution segment from another (S340). It is noteworthy that in addition to changes in shades or colors, other visual effects for a bin may be utilized, including changes in intensity, hue, or saturation, without limitation. The size of the shape is then normalized based on screen properties (e.g. zoom, number of objects on the map, etc.) before the shape is graphically rendered (S350).

The mapping process for the attributes, depending on implementation and the shape chosen to represent the distribution, may comprise computing the cumulative aggregated value for each bin to which one or more attributes are clustered. This computation in a circular graphical presentation such as that disclosed in the above example may be performed by computing the cumulative aggregated value for each bin as a radius of the circles formed, as provided below. It is noteworthy that since the scheme disclosed here depends on the normalization of aggregated value of distribution values for a plurality of events over time (i.e., it does not require direct or one-to-one mapping of data points for each target event to pixels on the display screen), the visual rendering of the shapes is independent of the size of the display area.

The cumulative value of a bin $f(x_i)$ is computed according to the following formula, where i represents the number of attributes clustered in bin $f(x_i)$ and $y_j$ represents the attribute clustered in bin $f(x_j)$ at position j:

$$f(x_i) = |y_i| + \sum_{j=0}^{i-1} |y_j|$$

The radius of the circle may be determined based on the computed value for its area according to the following formula:

$$r_k = \sqrt{\frac{f(x_i)_{x \in [i,j)}}{\pi}}$$

Accordingly, the shapes are graphically rendered based on one or more of the following: the color-coding or shading scheme mapped to each ring, the color assigned to each bin, and the number of objects in each bin. Depending on implementation, the drawn shapes may be rendered on the screen according to the desired topology (e.g., using longitude/latitude for maps). It is noteworthy, that the above disclosed technique is not only a method for visually mapping distribution at certain locations, but may be applied to many other tasks such as comparison of location, similarity search, spatial clustering, homogeneity assessment, etc.

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4A:
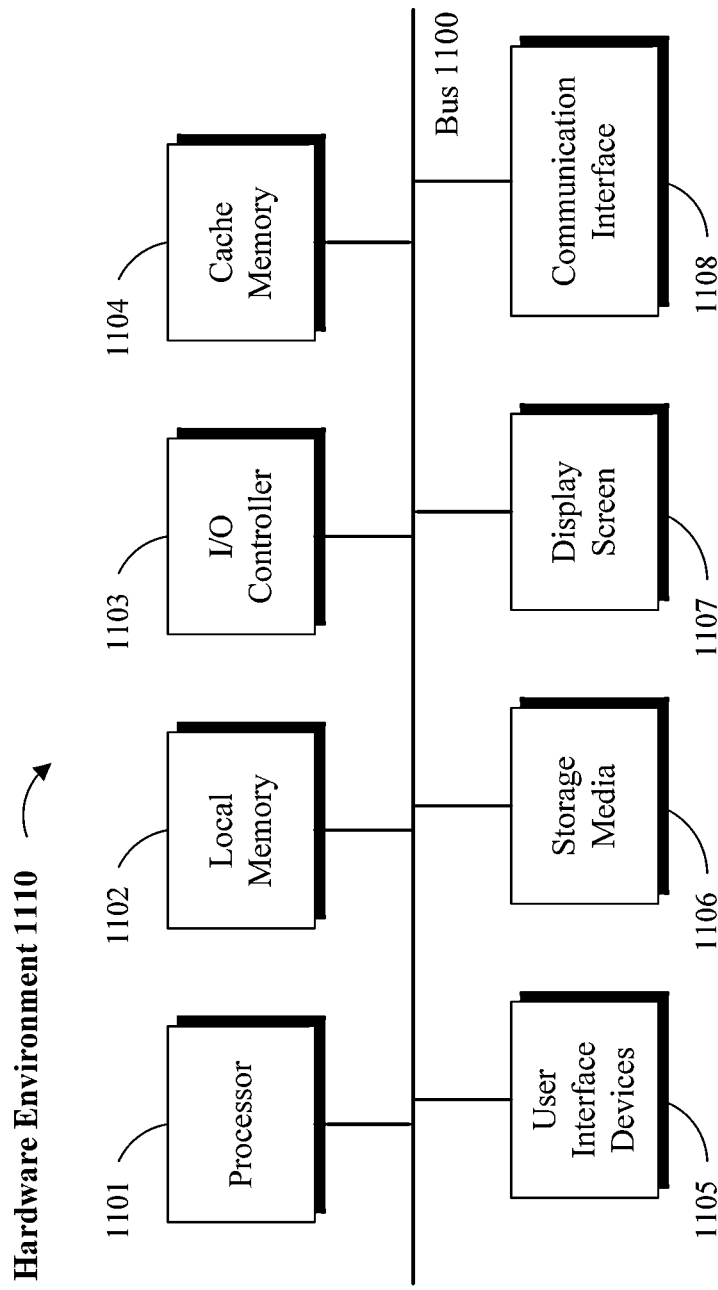
FIGS. 4A and 4B are block diagrams of hardware and software environments in which the disclosed systems and methods may operate, in accordance with one or more embodiments.
Figure 4B:
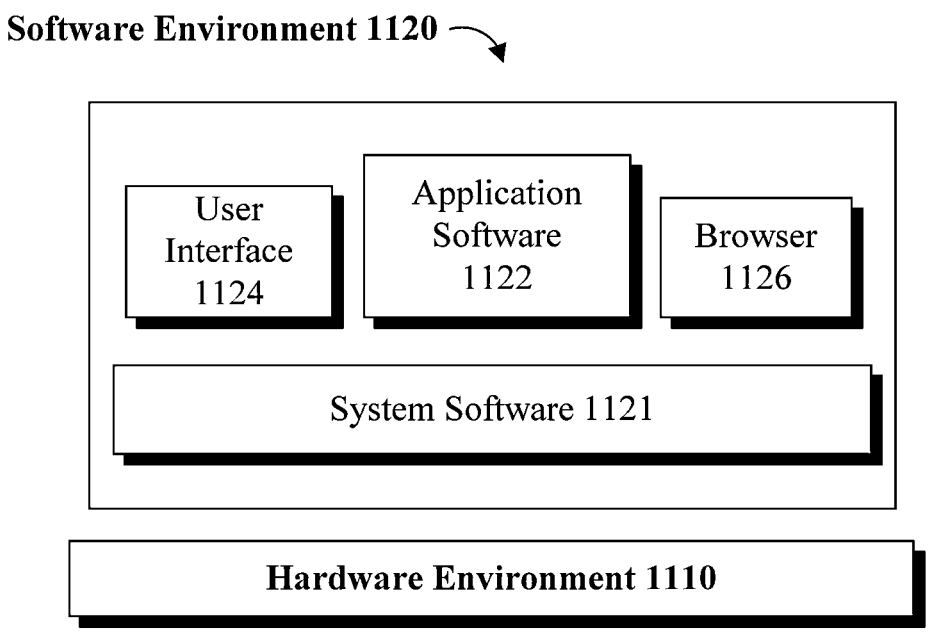

Referring to FIGS. 4A and 4B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4A, the application software and logic code disclosed herein may be implemented in the form of machine readable code executed over one or more computing systems represented by the exemplary hardware environment 1110. As illustrated, hardware environment 1110 may comprise a processor 1101 coupled to one or more storage elements by way of a system bus 1100. The storage elements, for example, may comprise local memory 1102, storage media 1106, cache memory 1104 or other machine-usable or computer readable media. Within the context of this disclosure, a machine usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include, but are not limited to, compact disk, read only memory (CD-ROM), compact disk read/write (CD-R/W), digital video disk (DVD), or high definition video disk (HD-DVD).

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, can be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A computer-implemented method for presentation of value distributions in a graphical user interface, the method comprising:
    computing a plurality of value distributions based on measurements performed for target values for one or more positions spread across a space, wherein a series of measurements are performed for at least a target point in the space;
    computing a cumulative distribution for the plurality of value distributions associated with the target point along predetermined time intervals;
    dividing the cumulative distribution into bins for one or more time periods corresponding to said predetermined time intervals;
    mapping attributes associated with the target point into a number of shapes, wherein the number of shapes does not directly correspond to the number of measurements performed for the target point or used in the computing of the plurality of value distributions;
    using a scaling function, assigning a color attribute from a color scheme to each bin; and
    normalizing a size of at least one shape based on visual properties before the respective shape is graphically rendered in the graphical user interface.

2. The method of claim 1, wherein the cumulative value of a bin f(xi) is computed according to the following formula, where i represents the number of attributes clustered in bin $f(x_i)$ and $y_j$ represents the attribute clustered in bin $f(x_i)$ at position j:

$$f(x_i) = |y_i| + \sum_{j=0}^{i-1} |y_j|.$$

3. The method of claim 1, wherein the assigning of the color attribute is performed based on user input.

4. The method of claim 1, wherein level of scaling associated with the scaling function is adjustable according to user input.

5. The method of claim 1, wherein the attributes associated with the target point are mapped to shapes with orbital circumferences, wherein one or more rings in the shape respectively correspond to one or more value distributions measured for the target point over predefined time intervals.

6. The method of claim 5 wherein size of the area for a ring in the shape indicates length of time associated with measurement of the target value for a corresponding target point.

7. The method of claim 6 wherein color attribute for a ring in the shape helps identify level of change in value distribution across the space in time.

8. A computer-implemented system for presentation of value distributions in a graphical user interface, the system comprising a computer readable storage medium having computer readable program instructions, wherein the computer readable storage medium is not a transitory signal per se, wherein the computer readable program instructions when executed on the system cause the system to:
    compute a plurality of value distributions based on measurements performed for target values for one or more positions spread across a space, wherein a series of measurements are performed for at least a target point in the space;
    compute a cumulative distribution for the plurality of value distributions associated with the target point along predetermined time intervals;
    divide the cumulative distribution into bins for one or more time periods corresponding to said predetermined time intervals;
    map attributes associated with the target point into a number of shapes, wherein the number of shapes does not directly correspond to the number of measurements performed for the target point or used in the computing of the plurality of value distributions;
    assign a color attribute from a color scheme to each bin, using a scaling function; and
    normalize size of at least one shape based on visual properties before the respective shape is graphically rendered in the graphical user interface.

9. The system of claim 8, wherein the cumulative value of a bin f(xi) is computed according to the following formula, where i represents the number of attributes clustered in bin $f(x_i)$ and $y_j$ represents the attribute clustered in bin $f(x_i)$ at position j:

$$f(x_i) = |y_i| + \sum_{j=0}^{i-1} |y_j|.$$

10. The system of claim 8, wherein the assigning of the color attribute is performed based on user input.

11. The system of claim 8, wherein level of scaling associated with the scaling function is adjustable according to user input.

12. The system of claim 8, wherein the attributes associated with the target point are mapped to shapes with orbital circumferences, wherein one or more rings in the shape respectively correspond to one or more value distributions measured for the target point over predefined time intervals.

13. The system of claim 12 wherein size of the area for a ring in the shape indicates length of time associated with measurement of the target value for a corresponding target point.

14. The system of claim 13 wherein color attribute for a ring in the shape helps identify level of change in value distribution across the space in time.

15. A computer program product comprising a non-transitory data storage medium having a computer readable program, wherein the computer readable program when executed on a computer causes the computer to:
    compute a plurality of value distributions based on measurements performed for target values for one or more positions spread across a space, wherein a series of measurements are performed for at least a target point in the space;
    compute a cumulative distribution for the plurality of value distributions associated with the target point along predetermined time intervals;
    divide the cumulative distribution into bins for one or more time periods corresponding to said predetermined time intervals;
    map attributes associated with the target point into a number of shapes, wherein the number of shapes does not directly correspond to the number of measurements performed for the target point or used in the computing of the plurality of value distributions;
    assign a color attribute from a color scheme to each bin, using a scaling function; and
    normalize a size of at least one shape based on visual properties before the respective shape is graphically rendered in the graphical user interface.

16. The computer program product of claim 15, wherein the cumulative value of a bin f(xi) is computed according to the following formula, where i represents the number of attributes clustered in bin $f(x_i)$ and $y_j$ represents the attribute clustered in bin $f(x_i)$ at position j:

$$f(x_i) = |y_i| + \sum_{j=0}^{i-1} |y_j|.$$

17. The computer program product of claim 15, wherein the assigning of the color attribute is performed based on user input.

18. The computer program product of claim 15, wherein level of scaling associated with the scaling function is adjustable according to user input.

19. The computer program product of claim 15, wherein the attributes associated with the target point are mapped to shapes with orbital circumferences, wherein one or more rings in the shape respectively correspond to one or more value distributions measured for the target point over predefined time intervals.

20. The computer program product of claim 19 wherein size of the area for a ring in the shape indicates length of time associated with measurement of the target value for a corresponding target point.

* * * * *